United States Patent [19]

Chu et al.

[11] Patent Number: 5,051,455

[45] Date of Patent: Sep. 24, 1991

[54] ADHESION OF SILICONE SEALANTS

[75] Inventors: Hsien-Kun Chu, Wethersfield, Conn.; Russell P. Kamis; Loren D. Lower, both of Midland, Mich.

[73] Assignee: Dow Corning Corporation, Midland, Mich.

[21] Appl. No.: 466,121

[22] Filed: Jan. 16, 1990

[51] Int. Cl.$^5$ .............................................. C08K 9/06
[52] U.S. Cl. .................................... 523/212; 524/425; 524/788
[58] Field of Search ................. 523/212; 524/425, 788

[56] References Cited

U.S. PATENT DOCUMENTS

| | | | |
|---|---|---|---|
| 3,856,839 | 12/1974 | Smith et al. | 260/429.5 |
| 4,143,088 | 3/1979 | Favre et al. | 260/825 |
| 4,687,829 | 8/1987 | Chaffee et al. | 528/17 |
| 4,711,928 | 12/1987 | Lee et al. | 524/860 |

Primary Examiner—Melvyn J. Marquis
Attorney, Agent, or Firm—Edward C. Elliott

[57] ABSTRACT

A moisture curing silicone sealant which adheres to a variety of substrates is produced by a method which first mixes a trialkoxysilethylene endblocked polydiorganosiloxane, a trialkoxysilane crosslinker, and a beta-dicarbonyl titanium catalyst, then adds a precipitated calcium carbonate filler having a fatty acid treated surface.

8 Claims, No Drawings

ADHESION OF SILICONE SEALANTS

BACKGROUND OF THE INVENTION

1. Field of the Invention

This invention relates to a process of making silicone sealants of alkoxysilethylene endblocked polydiorganosiloxane and precipitated calcium carbonate fillers which have improved adhesion to substrates.

2. Background Information

Silicone sealants which cure through a neutral reaction are known in the art. Examples can be found in U.S. Pat. No. 3,856,839, issued Dec. 24, 1974, disclosing alkanedioxy titanium chelates which catalyze the cure of a composition which also contains methyltrimethoxysilane and a silanol chain-stopped polydiorganosiloxane fluid; and U.S. Pat. No. 4,143,088, issued Mar. 6, 1985, disclosing use of alkoxylated organosilicon compounds consisting of either monomers or polymers having difunctional, trifunctional, or tetrafunctional molecules, comprising at most 40 percent of difunctional monomers in an organosilicon composition which is storage stable in the absence of moisture and is rapidly curable into elastomers with self-adherent properties in the presence of water at room temperature.

The sealants such as described in these references have a tendency to require a longer time to cure as they shelf age. In some cases, the sealant arrives at a point where it no longer cures upon exposure to moisture. This is particularly serious, because the user does not realize the problem until after the sealant is put into place. To correct the problem, all of the uncured sealant must be removed and replaced, a very time consuming and expensive undertaking.

A method of improving the storage stability is shown in U.S. Pat. No. 4,687,829, issued Aug. 18, 1987. An improved sealant is produced by mixing alkoxy functional polydiorganosiloxane having alkoxysilethylene ends with a combination of trifunctional or tetrafunctional silane crosslinker and difunctional silane chain extender. A method of producing such a sealant having an in situ treated filler is taught in U.S. Pat. No. 4,711,928, issued Dec. 8, 1987.

Neutral curing sealants having reinforcing silica fillers have been produced which have a low modulus, but their adhesion to concrete has been marginal. A need exists for a low cost neutral sealant having good adhesion to a variety of substrates.

SUMMARY OF THE INVENTION

A moisture curing silicone sealant which adheres to a variety of substrates is produced by a method which first mixes a trialkoxysilethylene endblocked polydiorganosiloxane, a trialkoxysilane crosslinker, and a beta-dicarbonyl titanium catalyst, then adds a precipitated calcium carbonate filler having a fatty acid treated surface.

DESCRIPTION OF THE INVENTION

This invention relates to a process of producing silicone sealants containing polydiorganosiloxane having alkoxy endblocking, alkoxy functional chain extender, and titanium catalyst, wherein the improvement comprises a method consisting essentially of (A) first mixing in the absence of moisture (1) 100 parts by weight of a polymer mixture of the average formula

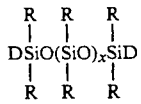

where each R is free of aliphatic unsaturation and is selected from the group consisting of monovalent hydrocarbon, monovalent halohydrocarbon, and monovalent cyanoalkyl radicals of 1 to 18 inclusive carbon atoms, each D is selected from the group consisting of vinyl radical and radicals of the formula

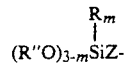

where each R'' is selected from the group consisting of methyl, ethyl, propyl, and butyl, Z is a divalent hydrocarbon radical or a combination of divalent hydrocarbon radicals and siloxane radicals, m is 0 or 1, and x is of a value such that the polymer has a viscosity of from 0.5 to 3000 Pa.s at 25° C., less than 40 percent of the total of the endblocking radicals in the polymer mixture being vinyl radicals, (2) from 0.1 to 14 parts by weight of a trialkoxysilane of the formula

where each R' is selected from the group consisting of methyl, ethyl, propyl, butyl, phenyl, and vinyl, R'' is as defined above, and (3) from 0.2 to 6.0 parts by weight of beta-dicarbonyl titanium catalyst, and then (B) adding after the above are mixed, (4) from 10 to 200 parts by weight of precipitated calcium carbonate filler, having a fatty acid surface treatment and a surface area equal to or greater than 22 m$^2$/g, then (C) storing the mixture in the absence of moisture, to give a sealant which is stable in the absence of moisture, and has adhesion to a variety of substrates.

The method of this invention produces a sealant which adheres to a variety of substrates. The method requires the above order of mixing as well as the ingredients specified in order to obtain the desired adhesion to a variety of substrates.

The method of this invention uses polymer of the formula

where each R is free of aliphatic unsaturation and is of the group monovalent hydrocarbon, monovalent halohydrocarbon, and monovalent cyanoalkyl radicals of 1 to 18 inclusive carbon atoms, each D is selected from the group consisting of the vinyl radical and radicals of the formula

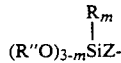

where each R'' is selected from the group consisting of methyl, ethyl, propyl, and butyl, Z is a divalent hydrocarbon radical or combination of divalent hydrocarbon radicals and siloxane radicals, m is 0 or 1, and x is of a value such that the polymer has a viscosity of from 0.5 to 3000 Pa.s at 25° C., less than 40 percent of the total of endblocking radicals D in the polymer mixture being vinyl radicals. R can be any of those monovalent hydrocarbon, monovalent halohydrocarbon, or monovalent cyanoalkyl radicals of 1 to 18 inclusive carbon atoms which are known to be useful in silicone sealant materials. The preferred radicals are methyl, ethyl, propyl, phenyl, and trifluoropropyl. Z is a divalent hydrocarbon radical or combination of divalent hydrocarbon radicals and siloxane radicals. The divalent hydrocarbon radical can be from 2 to 15 carbon atoms in the form of a divalent alkylene or arylene radical such as ethylene, propylene, hexylene, phenylene, and

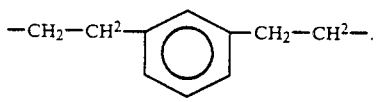

A preferred Z may be represented by the formula

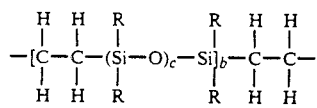

where R is as defined above, b is 0 or 1, and c is from 1 to 6.

The polymer of (1) can be produced by reacting a vinyl endblocked polydiorganosiloxane of the formula

     I where each R is as defined above, Vi is vinyl radical, and x is as defined above with as endcapping composition of the formula

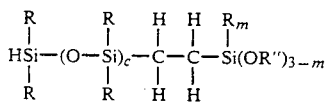     II where R, R″, and m are as defined above, and c is 1 to 6. This endcapping composition can be produced by a method comprising (A) mixing 1 mole of a composition (a) of the formula

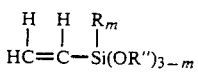

where R, R″, and m are as defined above, with greater than 2 moles of a composition (b) of the formula

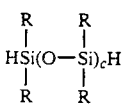

where R and c are as defined above, in the presence of a platinum catalyst and allowing to react, then, (B) optionally stripping the excess composition (b) from the product, to give an endcapping composition of the formula as given above. A preferred endcapping composition is that obtained when c is equal to 1 and m is equal to 0. The above endcapping composition, it's method of manufacture, and it's use in the manufacture of silicone sealants, having an alkoxy functional silane crosslinker and a titanium catalyst, is taught in U.S. Pat. No. 4,772,675, issued Sept. 20, 1988, which is hereby incorporated by reference to show the endcapping composition, it's manufacture, and it's use. The polymer produced from the above reaction of vinyl endblocked polydiorganosiloxane (I) and endcapping composition (II) can be represented by the formula

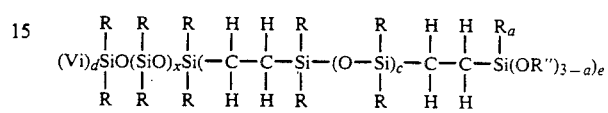

where each R, R″, Vi, m, c, and x, are as defined above, and d and e are chosen so that d is on average less than 40 percent of the total of d plus e.

The amount of the endcapping composition (II) used to react with the vinyl endblocked polydiorganosiloxane (I) is chosen so that the desired number of the vinyl endblocking groups are replaced with the alkoxysilethylene endblocking group from (II) on a molar basis. As an example, when the endcapping composition (II) is of the formula

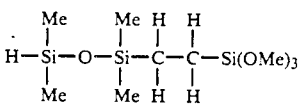

where Me is methyl radical and the vinyl endblocked polydiorganosiloxane (I) is a polydimethylsiloxane having a viscosity of about 55 Pa.s at 25° C. then the degree of endblocking versus the amount of endblocker used can be estimated from the following:

| Parts by Weight of Endblocker | Percent of Alkoxysilethylene Endblocks |
|---|---|
| 0.9 | 100 |
| 0.8 | 89 |
| 0.7 | 78 |
| 0.6 | 67 |
| 0.5 | 55 |

The above polymers can also be produced by using similar siloxanes and silanes in which the location of the hydrogen atom and the vinyl group which react together are reversed.

A trialkoxysilane (2) of the formula R'Si(OR″)₃ where R' and R″ are as defined above, is added as a crosslinker. These trialkoxysilanes and their method of manufacture are well known. The amount of trialkoxysilane preferably is from 0.1 to 14 parts by weight, with from 2 to 8 parts most preferred.

The sealants of this invention are cured through the use of a beta-dicarbonyl titanium catalyst (3) such as those described in U.S. Pat. No. 3,334,067, the patent being herein incorporated by reference to show beta-dicarbonyl titanium catalyst and methods of manufacture. Preferred catalysts include bis-(acetylacetonyl)-diisopropyltitanate, and 2,5-di-isopropoxy-bis-ethylacetoacetate titanium. The amount of catalyst is from 0.2 to 6.0 parts by weight per 100 parts by weight of polymer (1). Preferred are from 0.5 to 3.0 parts by weight.

The filler used in the compositions of this invention is a precipitated calcium carbonate filler, having a fatty acid surface treatment and a surface are equal to or greater than 22 m²/g. Precipitated calcium carbonate fillers are man-made materials formed through a "Milk of Lime" process which consists of exposing limestone to very high temperatures to form calcium oxide, then reacting with water and precipitating with carbon dioxide. The process typically gives particle sizes of from 3 to 0.07 micrometers in average diameter. The precipitated calcium carbonates tend to have a higher water content than ground calcium carbonate due to their smaller particle size and the process of manufacture. The precipitate is then treated with a fatty acid, such as stearic acid to improve its compatibility with the polymer in which it is to be used. The fatty acid on the filler surface has an effect in preventing crepeing or hardening of the sealant while it is being stored. It also has an effect upon the rheology of the sealant. Useful levels of treatment are thought to range from 1.5 to 4.5 percent by weight of the weight of the filler. Below this range the sealant is thick and difficult to extrude. Above this range, the sealant may be too low in viscosity and of a runny consistency.

The surface area of the filler has a distinct effect upon the adhesion obtained. Treated calcium carbonates having a surface area below 22 m²/g, such as 19 to 21 m²/g, have been found to give poor adhesion to a variety of substrates. Treated calcium carbonates having a surface area of over 22 m²/g, such as 23 to 30 m²/g, give good adhesion to a variety of substrates. The precipitated calcium carbonates of this invention have a nominal particle size in the range of about 0.04 to 0.08 micrometers. Those precipitated calcium carbonates which have a nominal particle size in this range, but do not have the required surface area, do not result in sealants which give the desired degree of adhesion to a variety of substrates. These treated, precipitated calcium carbonates are commercially available. Preferred fillers for this invention are Hakuenka-CCR, obtained from Shiraishi Kogyo Kaisha, Ltd., having a surface area of about 30 m²/g and about 2.3 percent fatty acid treatment, and Winnofil-SPM, obtained from ICI Resins US, having a surface area of about 23 m²/g and about 2.7 percent fatty acid treatment. The filler is preferred in amounts from 60 to 180 parts by weight per 100 parts by weight of polymer (1) with amounts from 70 to 90 most preferred. The optimum amount of filler will depend upon the polymer used and the filler used. The amount of filler used has an effect upon the physical properties of the cured sealant, particularly the tensile strength and elongation. As the amount of filler is increased the elongation is decreased and the modulus is increased.

It has also been found that when amounts of the above treated fillers of about 60 to 90 parts per 100 parts of polymer are used, up to 50 percent of the filler can be replaced by a surface treated ground calcium carbonate having an average particle size of about 3 micrometers without loss of adhesion.

The process of this invention requires that the polymer mixture (1), the trialkoxysilane (2), and the beta-dicarbonyl titanium catalyst (3) be mixed together before the addition of the precipitated calcium carbonate filler (4). The trialkoxysilane (2) must be added to the polymer mixture (1) before or at the same time as the titanium catalyst (3), and they must be mixed together before the filler (4) is added. Since the polymer mixture (1) and the trialkoxysilane (2) will react with each other, particularly in the presence of the beta-dicarbonyl titanium catalyst (3) in the presence of moisture, it is necessary that moisture not be present in these ingredients and that the mixing be carried on without allowing the ingredients to come into contact with moisture from the atmosphere. A preferred procedure adds the polymer mixture to a mixing device which can be subjected to vacuum, then mixes in the trialkoxysilane until uniform. The catalyst is then added and mixed until uniform. At this point in the process it is preferred to draw a vacuum on the mixture while continuing mixing in order to remove residual volatile materials, including by-products from any water which may have been introduced and alcohol which is generated. The precipitated calcium carbonate filler is then added and mixed until uniform. A vacuum is again applied to the mixture to remove any volatile materials, including any moisture added with the filler and any alcohol which is generated, and to remove air from the mixture. The deaired mixture is then transferred to storage tubes, without exposure to moisture in the air. If the process is changed so that the filler is added before the catalyst and chain extender, the finished sealant is a different product. Sealants made not following the order of mixing of this invention have poorer adhesion to substrates than sealants which are processed according to the process of this invention.

The following examples are included for illustrative purposes only and should not be construed as limiting the invention which is properly set forth in the appended claims.

ALKOXYSILETHYLENE ENDBLOCKED POLYDIORGANOSILOXANE

The polymer mixtures used in this invention were produced by placing 100 parts by weight of dimethylvinylsiloxy endblocked polydimethylsiloxane having a viscosity of about 55 Pa.s at 25° C. in a mixing vessel and adding 0.01 part of chloroplatinic acid complex of divinyltetramethyldisiloxane, which had been diluted with dimethylvinylsiloxy endblocked polydimethylsiloxane to provide 0.7 weight percent platinum in the complex, and stirring for 10 minutes. Then 1.1 parts (polymer A) or 0.7 part (polymer B) of a tetramethyldisiloxane having a trimethoxysilylethylene group on one end with the formula

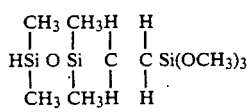

was slowly added and agitation was continued for 3 to 4 hours, maintaining the temperature below 50° C. at all times. Polymer A, with 1.1 parts of endcapper per 100 parts of polymer would have essentially all of the endgroups blocked with the trialkoxysilethylene group. Polymer B, with 0.7 part of endcapper per 100 parts of polymer would have approximately 80 percent of the endblocks as trimethoxysilethylene groups and 20 percent as vinyl groups.

EXAMPLE 1

A number of different precipitated calcium carbonate fillers were used to prepare sealants for adhesion testing. Each sealant sample was prepared by first adding 100 parts of polymer B, above, to a mixer which was sealed to prevent exposure of the contents to moisture from the atmosphere, then adding 7 parts of methyltrimethoxysilane, without exposure to the atmosphere, and mixing 4 minutes until uniform. Then 2 parts of 2,5-di-isopropoxy-bis-ethylacetoacetate titanium catalyst was mixed in, again without exposure to moisture. A vacuum of about 20 inches of vacuum was applied to the mixture and mixing continued for about 4 minutes to remove any volatile materials present. Next, 85 parts of a precipitated calcium carbonate filler as shown in Table I was admixed, again without allowing the contents of the mixture exposure to the atmosphere. After mixing to uniformity, a vacuum of about 20 inches of mercury was applied to the mixer contents and mixing continued for about 10 minutes to remove volatiles and air from the mixture, which was then transferred to storage tubes.

A bead of each sealant was extruded onto a variety of surfaces and allowed to cure for 7 days at 25° C. and 50 percent humidity. The adhesion of the sealant to the substrate surface was then evaluated by pulling the bead from the surface. If the bead came free of the surface, the failure was listed as adhesive failure. If the bead came off the surface but left sealant on the surface, showing that the sealant itself had ruptured, the failure was listed as cohesive failure. In order to be considered adhered, the sealant must be a cohesive failure. Table I shows that the Hakuenka-CCR filler gave the best adhesion, followed by the Winnofil-SPM.

TABLE I

| Filler | Nominal Particle Size micrometer | Fatty Acid Treatment Level percent | Nominal Moisture Content percent | Surface Area m2/g |
|---|---|---|---|---|
| Hakuenka-CCR | 0.07 | 2.3 | 0.8 | 30 |
| Winnofil-SPM | 0.08 | 2.7 | 0.4 | 23 |
| Ultrapflex* | 0.07 | 2.5 | 0.3 | 21 |
| Multiflex* | 0.07 | 1.8 | 0.4 | 21 |

| Filler | Adhesion | | | |
|---|---|---|---|---|
|  | Grey PVC | Duranar | ABS (M591) | ABS (M9020) |
| Hakuenka-CCR | C | C | C | C |
| Winnofil-SPM | A | C | C | A |
| Ultrapflex* | A | A | A | A |
| Multiflex* | A | A | A | A |

A = adhesive failure
C = cohesive failure
grey PVC = grey polyvinylchloride
Duranar =
ABS (M591) =
ABS (M9020) =
*comparative

EXAMPLE 2

A similar series of sealants were prepared as in Example 1, except the amount of filler used was 70 parts filler per 100 parts polymer. These sealants were evaluated for physical properties, with the results shown in Table II.

Test samples were prepared by extruding the sealant from the storage tube into a chase and smoothing the sealant into a slab, 0.080 inches in thickness. After curing for 7 days at 50 percent relative humidity and 25° C., test pieces were cut out and tested, durometer in accordance with ASTM D 2240, tensile strength and elongation in accordance with ASTM D 412. The rate of curing of the samples was determined by a tack free time (TFT). The tack free time is defined as the time in minutes required for a curing material to form a nontacky surface film. A sample is spread on a clean smooth surface and timing is begun. Periodically, a clean strip of polyethylene film is laid upon a fresh surface and a one ounce weight applied to it. After 4 seconds, the weight is removed and the strip gently pulled off. The time when the strip pulls cleanly away from the sample is recorded as the tack free time.

TABLE II

| Filler | TFT min. | Durometer Shore A | Tensile Strength psi | Elongation at Break percent |
|---|---|---|---|---|
| Hakuenka-CCR | 65 | 30 | 200 | 330 |
| Winnofil-SPM | 49 | 33 | 270 | 280 |
| Ultrapflex* | 53 | 33 | 220 | 230 |
| Multiflex* | 45 | 36 | 230 | 210 |

*comparative

EXAMPLE 3

A comparative sealant was prepared using the formulation of Example 1 with the Hakuenka-CCR filler, but the order of mixing was changed. The polymer was first mixed with the filler and deaired, then the methyltrimethoxysilane and 2,5-di-isopropoxy-bis-ethylacetoacetate titanium catalyst were added and deaired and packaged as in Example 1. Adhesion of this comparative sealant was compared to that of the sealant of Example 1 by forming a bead of sealant on several different substrates, as shown in Table III, curing and testing as in Example 1.

TABLE III

| | Adhesion As percent of cohesive failure | |
|---|---|---|
| Substrate | Example 1 | This Example* |
| Reflective Glass | 100 | 10 |
| Copper | 100 | 0 |
| Polystyrene | 100 | 0 |
| Acrylobutadienestyrene | 100 | 0 |
| Polycarbonate-ABS | 0 | 100 |

*comparative

Similar samples were made using the Winnofil-SPM filler, using the claimed process of example 1, and the process of this example. The samples made using the procedure of example 1 gave good adhesion, while the samples made using the procedure of this example did not give good adhesion.

EXAMPLE 4

A sample sealant was made using the procedure of Example 1 with 100 parts of polymer B, 7 parts of methyltrimethoxysilane, and 2 parts of 2,5-di-isopropoxy-bis-ethylacetoacetate titanium. The filler was 85 parts of Hakuenka CC having a surface area of about 27 m2/g, about 2.3 percent by weight fatty acid treatment, and a nominal particle size of about 0.04 micrometer.

A similar sealant was prepared, but the filler was a mixture of 90 parts of Winnofil-SPM and 10 parts of CS-11, a calcium stearate treated calcium carbonate filler having an average particle size of about 3 micrometers.

Beads of each of the above sealants were placed upon the substrates listed in Table IV and allowed to cure for 7 days at room temperature. The beads were pulled off of the substrates and the failure noted as shown.

TABLE IV

| Filler Substrate | Type of Adhesion Failure | |
|---|---|---|
| | Hakuenka-CC | Winnofil-SPM & CS-11 |
| Reflective Glass | C | C |
| Anodized Aluminum | C | C |
| Duranar X.L. | C | C |
| Glass | C | C |

C = cohesive failure

EXAMPLE 5

A series of sealants were prepared using the process and ingredients of Example 1, except a blend of filler was used consisting of Hakuenka-CCR and CS-11, a ground calcium carbonate with a fatty acid surface treatment, in the proportions shown in Table V. A bead of sealant was applied to the substrates shown and tested for adhesion after cure for 7 days with the results shown in Table V.

TABLE V

| | Type of Failure | | | |
|---|---|---|---|---|
| Hakuenka-CCR, parts | 85 | 76 | 69 | 37 |
| CS-11, parts | 0 | 9 | 16 | 28 |
| Substrate | | | | |
| polyvinylchloride, grey | C | C | C | C |
| FR-4 | C | C | C | C |
| Duranar-XL | C | C | C | C |
| Anodized Aluminum | C | C | C | C |
| Glass | C | C | C | C |
| Alclad Aluminum | C | C | C | C |
| Magnum 541 | C | C | C | A |
| Acrylonitrilebutadienestyrene | C | C | C | A |
| Polyurethane | C | C | C | C |

C = cohesive failure
A = adhesive failure

EXAMPLE 6

A series of comparative sealants were prepared using fumed silica filler and a variety of polymer mixtures having differing degrees of vinyl and trimethoxysilethylene endblocking. Sealant 6-1 was made by mixing 100 parts of polymer which was made like polymer A described above, but using 0.8 part of the endcapping agent described above to give a polymer having about 90 percent trimethoxysilethylene endblocking and 10 percent vinyl endblocking, with 8 parts of methyltrimethoxysilane and 1.5 parts of tetrabutyltitanate until uniform and without exposure to moisture. Then 10 parts of fume silica having a surface area of about 150 m2/g was mixed in until uniform and the sealant packaged without exposure to moisture. Sealant 6-2 was made by mixing 100 parts of polymer A, described above, 7 parts of dimethyldimethoxysilane, and 1.6 parts of tetrabutyltitanate until uniform and without exposure to moisture. Then 10 parts of the above fume silica was mixed in until uniform and the sealant packaged without exposure to moisture. Sealant 6-3 was made by mixing 100 parts of polymer B, described above, 7 parts of methyltrimethoxysilane, 1.6 parts of tetrabutyltitanate, and 0.61 parts of ethylacetoacetate until uniform and without exposure to moisture. Then 9 parts of the above fume silica was mixed in until uniform and the sealant packaged without exposure to moisture.

Beads of each of the sealants were then applied to various substrates as shown in Table VI and allowed to cure for 14 days at 23° C. and 50 percent relative humidity. The adhesion of the sealants to the substrates is shown in Table VI.

TABLE VI

| | Adhesion | | |
|---|---|---|---|
| Substrate | 6-1* | 6-2* | 6-3* |
| Sandstone | A | A | A |
| Limestone | A | A | A |
| Concrete | A | A-C | A-C |
| polyvinylchloride, grey | A | A | A |
| Duranar-XL | A | A | A |
| Alclad aluminum | A | A | A |
| Magnum 541 | A | A | A |
| Acrylonitrilebutadienestyrene | A | A | A |
| Polyurethane | A | A | A |

*comparative example
A = adhesive failure
C = cohesive failure
A-C = mixture of adhesive and cohesive failure Even though these sealants were made using the same order of mixing and the same polymer and crosslinking ingredients as is used in the sealants of this invention, the sealants made using fume silica as the filler do not give adequate adhesion to a variety of substrates.

That which is claimed is:

1. A process of producing silicone sealants containing polydiorganosiloxane having alkoxy endblocking, alkoxy functional chain extender, and titanium catalyst, wherein the method consists essentially of
   (A) first mixing in the absence of moisture
   (1) 100 parts by weight of a polymer mixture of the average formula

where each R is free of aliphatic unsaturation and is selected from the group consisting of monovalent hydrocarbon, monovalent halohydrocarbon, and monovalent cyanoalkyl radicals of 1 to 18 inclusive carbon atoms, each D is selected from the group consisting of vinyl radical and radicals of the formula

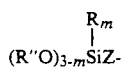

where each R" is selected from the group consisting of methyl, ethyl, propyl, and butyl, Z is a divalent hydrocarbon radical or a combination of divalent hydrocarbon radicals and siloxane radicals, m is 0 or 1, and x is of a value such that the polymer has a viscosity of from 0.5 to 3000 Pa.s at 25° C., less than 40 percent of the total of the endblocking radicals D in the polymer mixture being vinyl radicals,
   (2) from 0.1 to 14 parts by weight of a trialkoxysilane of the formula

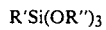

where each R' is selected from the group consisting of methyl, ethyl, propyl, butyl, phenyl, and vinyl, R" is as defined above, and
   (3) from 0.2 to 6.0 parts by weight of beta-dicarbonyl titanium catalyst, and then (B) adding after the above are mixed,
(4) from 10 to 200 parts by weight of precipitated calcium carbonate filler, having a fatty acid surface treatment and a surface area equal to or greater than 22 m²/g, then
(C) storing the mixture in the absence of moisture,
to give a sealant which is stable in the absence of moisture, and has adhesion to a variety of substrates.

2. The process of claim 1 in which R and R″ are methyl radicals.

3. The process of claim 2 in which R′ is methyl radical.

4. The process of claim 2 in which the trialkoxysilane (2) is methyltrimethoxysilane and is present in an amount of from 2 to 8 parts by weight.

5. The process of claim 4 in which the beta-dicarbonyl titanium catalyst (3) is 2,5-di-isopropoxy-bis-ethylacetoacetate titanium and is present in an amount of from 0.5 to 3.0 parts by weight.

6. The process of claim 2 in which R′ is methyl radical, the trialkoxysilane (2) is methyltrimethoxysilane and is present in the amount of from 2 to 8 parts by weight, and the beta-dicarbonyltitanium catalyst is 2,5-di-isopropoxy-bis-ethylacetoacetate titanium and is present in an amount of from 0.5 to 3.0 parts by weight.

7. The silicone sealant produced by the process of claim 1.

8. The silicone sealant produced by the process of claim 6.

* * * * *